3,317,487
NOVEL THERMAL STABLE RESINS AND PRODUCTS PRODUCED THEREWITH
Harry A. Smith, Midland, Mich., assignor to The Dow Chemical Company, Midland, Mich., a corporation of Delaware
No Drawing. Filed Mar. 27, 1963, Ser. No. 268,445
6 Claims. (Cl. 260—79)

The present invention relates to a novel polymeric materials and more particularly concerns a new and useful class of infusible, high molecular weight, insoluble, thermally stable polyphenylene sulfides and polyphenylene sulfoxides and to a novel method for their preparation. Further, the present invention concerns laminates, films and coatings prepared by employing the novel resins of the present invention.

Linear polyphenylene sulfides $[(C_6H_4S)_x]$ have been prepared by the technique of Macallum as taught in U.S. Patents Nos. 2,513,188 and 2,538,941. Efforts to reproduce, on a large scale, the optimum results of Macallum have not been commercially successful. In attempting to produce the resins taught by Macallum on a commercial scale the discovery set forth in copending application Ser. No. 85,209, filed Jan. 27, 1961, by Lenz et al. entitled, "Method for Preparing Linear Polyarylene Sulfides," was made. The procedures and techniques therein described along with the laboratory techniques of Macallum produce substantially linear polyphenylene sulfides of the generic structure of $(C_6H_4S)_x$ wherein $x$ is an integer great enough to produce a polymeric material having an average molecular weight of from about 2000 to about 25,000. The linear polyphenylene sulfoxides can be prepared from the linear sulfides according to the procedure set forth in my copending application Ser. No. 268,444, filed even date herewith, entitled, "Sulfoxide Resins." These linear polymers are diphenyl ether soluble, fusible at 250°–300° C., commence degrading at about 350°–450° C. and completely degrade without any substantial carbonaceous residue on slow heating at about 600° C. in air. These polymers have other properties which, within the limits of temperature stability and solubility, make them very desirable materials. Since the desirable properties make the polymers extremely useful, it would be additionally advantageous if the thermal stability could be improved and the solubility reduced without materially affecting the other desirable properties.

It has now been found that an improved class of polyarylene sulfides and polyarylene sulfoxides can be obtained by heating a linear polyphenylene sulfide (prepared, for example, in the manner of Macallum or Lenz et al.) or a linear polyphenylene sulfoxide (prepared in the manner of my copending application Ser. No. 268,444, filed even date herewith, entitled, "Sulfoxide Resins") at a temperature of from about 350° C. to about 700° C. for from about ½ to about 100 hours under an inert non-oxidizing atmosphere such as argon. It is to be understood that some improvement is achieved at the lower temperature upon short duration but that the time vs. temperature relation is relatively inverse to achieve the most desirable improvements. The resulting products are glass-like black to brown materials, insoluble in diphenyl ether and having good properties when molded. The materials are substantially infusible but soften sufficiently to pressure mold and shape, press into films or draw or extrude into fibers, do not degrade materially at temperatures below about 600° C. even in air, and, are substantially transparent when molded into very thin films. The heat treated products are useful as an adhesive for laminating wood, metal and/ or glass in two or more layers having bond tensile strengths of from 250 to 2500 p.s.i. or greater.

It is to be understood that the properties of the heat treated material while they are improved in every instance vary considerably with the nature of the starting material such as the molecular weight, melt viscosity and the like. The length of time and temperature of the heat treatment can also be used to vary the properties within wide limits, it being understood that after even the mildest heat treating, some improvement in heat stability and a lower solubility in diphenyl ether is obtained, for example, at treatment temperatures materially lower than 400° C. for less than about 40 hours the observable improvement is substantially in the desired solubility in diphenyl oxide and higher melting points.

The materials produced by the present invention are adhesives when softened and can be employed to prepare laminates of wood, metal and glass. The laminate bond has all of the characteristics of the heat treated resin when cooled. For instance, two pieces of metal can be joined together by merely placing a small amount of the heat treated material between the metal pieces and pressing the two metal pieces together while heating them to the softening point of the resin. The bond thickness can be controlled by applying more or less pressure to the joint. It has been found that 1,000 p.s.i. is usually sufficient but that pressures of 10,000 p.s.i. or more are not detrimental since some of the adhesive resin remains in the bond and while bond strengths are not maximum they are sufficient to meet most joint and laminating bond strength specifications.

It is to be further understood that the resins of the present invention can be employed as molding compositions. Thus one can prepare a shaped form of the resin by heating the resin to its softening point and applying pressure to press the resin into the intricacies of the mold pattern. As in the case of the laminate joint the pressure can be from about 1,000 to 40,000 or more pounds p.s.i. depending on the temperature at which the process is to be conducted and the intricacies of the mold pattern. The material is adhesive at its softening point as indicated above and to prevent its adherence to the mold pattern after molding high-temperature (300° C. or greater), stable, mold release material must be employed. Suitable materials are fluorocarbons, such as Fluoroglide and silicones.

In accordance with the present invention and as must be now apparent from the foregoing teaching regarding laminating and molding use, the results of the present invention can also be pressed into thin films by heating the resin to its softening point and applying pressures of 10,000 to 40,000 p.s.i. to a press platen. In this connection if the film is to be stripped from the base mold release materials again are essential. If the film is to be used as a protective coating, then, of course, only the platen or pressing member need have the release material.

The polyphenylene sulfides which can be successfully treated in accordance with the present invention and which after treatment exhibit improved high temperature stability and which are then solvent insoluble are those having the generic formula $(C_6H_4S)_x$ wherein $x$ represents an integer which will result in a material having a melt viscosity, indicative of molecular weight, of greater than $1 \times 10^3$ poises. These starting materials can be prepared by the following general method.

PREPARATION OF POLYPHENYLENE SULFIDES 4.68 grams (0.022 mole) of Cu p-bromothiophenoxide (99–100% purity) (prepared in accordance with copending application Ser. No. 268,470, filed even date herewith, entitled "Cuprous p-Halothiophenoxide"), was placed in a 30 ml. heavy-walled ampoule under an inert atmosphere in a dry box. In certain instances a solvent (pyridine) was also added to obtain data relative to solution polymerization. The ampoule was fitted with a stopcock, removed from the dry box and sealed with a torch. The sealed ampoule was placed in a stainless steel container which, in turn, was positioned in an aluminum block containing a strip heater and temperature regulator. This entire assembly was attached to a rocking mechanism. The ampoule was heated to 200, 212 or 250° C. and maintained thereat with continuous rocking for various periods of time. Thereafter the ampoule was cooled to room temperature, then in liquid nitrogen, opened and the contents extracted with water when indicated in the following table. The extracted reaction mixture was dissolved in boiling diphenyl ether. This diphenyl ether solution was slowly added dropwise into methanol with vigorous stirring. The precipitated polymer which formed was filtered off, washed with ether and dried under a vacuum at 60° C. The temperature of reaction, the presence or absence of solvent and the reaction time are recorded below along with the yield, analysis and softening point, were determined, of the polymer produced in the manner aforedescribed.

Alternatively, the reaction mixture can be extracted with ammonium hydroxide to remove the copper bromide. When this technique is employed, the resulting mixture, free of CuBr, can be employed as is or further extracted with boiling diphenyl ether and the extract employed as hereinafter set forth.

It is to be understood that in preparing the linear polymer one can employ the alkali metals, alkaline earth metals as well as the metals, copper, silver, and the like. While any one of the above metals is operative it is preferable to employ copper.

The following table sets forth the results of reaction carried out as aforedescribed under preparation of polyphenylene sulfide.

| Reaction Conditions | | Solvent | Percent Soluble in diphenyl oxide | Yield[1] Percent | Melting Point ° C. | Molecular Weight 10³ | $\eta 303$[2] Poise |
|---|---|---|---|---|---|---|---|
| Time, Hrs. | Temp., ° C. | | | | | | |
| 40 | 200 | Pyridine | 100 | 86.5 | 265–270 | 9.1 | $8 \times 10^3$ |
| 16 | 250 | ----do---- | 100 | 83.0 | 278–285 | 17.0 | $2.3 \times 10^5$ |
| 1 | 250 | ----do---- | 100 | 87.4 | 262–265 | 6.2 | $1.5 \times 10^3$ |
| 16 | 200 | ----do---- | 100 | 96.0 | 277–282 | 6.9 | $1.8 \times 10^3$ |
| 216 | 212 | None | 81 | 100.0 | 279–285 | 18.0 | $3.3 \times 10^5$ |
| 156 | 212 | ----do---- | 69.1 | 100.0 | 275–280 | 18.4 | $1.5 \times 10^6$ |
| 15 | 212 | ----do---- | 100 | 55.0 | 264–274 | 4.6 | 200 |
| 264 | 212 | ----do---- | 77 | 100.0 | 276–280 | 10.0 | $1.8 \times 10^4$ |
| 216 | 212 | ----do---- | 76 | 100.0 | 278–283 | 13.0 | $6.0 \times 10^4$ |

[1] Based on starting cuprous bromothiophenoxide.
[2] Melt viscosity at 303° C.

The following examples illustrate the present invention but are not to be construed as limiting:

*Example 1.—General Procedure*

A linear polyphenylene sulfide polymer prepared in the aforedescribed manner is placed in a beaker which in turn is placed in a Vycar tube fitted with a gas inlet and outlet. The system is flushed with an inert gas, such as argon, then immersed in a stirred eutectic salt bath maintained at 400° C. or 500° C. The heat treatment is carried on for several hours to about 144 hours, after which the system is removed from the bath, cooled, the gas flow stopped and the heat treated sample removed by chipping the beaker away from the sample. The following table sets forth the properties of the starting polyphenylene sulfide, the conditions of heat treatment and the properties of the heat treated product.

| Initial Polymer Properties | | | | Heat Treatment Conditions | | Heat Treated Properties | | | | | | |
|---|---|---|---|---|---|---|---|---|---|---|---|---|
| Percent soluble in diphenyl oxide | Melting point, ° C. | Molecular weight×10³ | Melt viscosity at 303° C. poise | Time, hours | Temperature, ° C. | Percent solubility in diphenyl oxide | Weight loss, percent | Softening point, ° C. | Flexibility[1] | Toughness[1] | Adherence[2] | Transparency[3] |
| I | II | III | IV | V | VI | VII | VIII | IX | X | XI | XII | XIII |
| 100 | 265–270 | 9.1 | $8 \times 10^3$ | 0 | 400 | 100 | ---- | 265–270 | 1 | 1 | 1 | – |
| | | | | 20 | ---- | 99 | 16.1 | 283–287 | 1 | 1 | 1 | – |
| | | | | 40 | ---- | 99 | 21.7 | 285–290 | 2 | 2 | 2 | – |
| 100 | 264–274 | 4.6 | 200 | 72 | 400 | 0 | 22.8 | >600 | 4 | 4 | 6 | + |
| | | | | [4]72 | ---- | 0 | 28.0 | 600 | 3 | 3 | 4 | + |
| 100 | 277–282 | 6.9 | $1.8 \times 10^3$ | 0 | ---- | 100 | ---- | 264–274 | 2 | 2 | 2 | – |
| | | | | 72 | 400 | 0 | 13.9 | >600 | 6 | 6 | 6 | + |
| | | | | 0 | ---- | 100 | ---- | 277–282 | 4 | 4 | 4 | + |
| 77.2 | 276–280 | 10.0 | $1.8 \times 10^4$ | 72 | 400 | 0 | 18.1 | >600 | 6 | 6 | 5.5 | + |
| | | | | 0 | ---- | 77.2 | ---- | 276–280 | 3 | 3 | 3 | – |
| | | | | [4]72 | ---- | 0 | 45.9 | >600 | 3.5 | 3.5 | 6 | + |
| 100 | 278–283 | 13.0 | $6 \times 10^4$ | 0 | 400 | 100 | ---- | 278–283 | 2 | 2 | 2 | – |
| | | | | 72 | ---- | 0 | 29.1 | >600 | 6 | 6 | 5 | + |
| | | | | 288 | ---- | 0 | 30.0 | >600 | 6 | 6 | 5 | + |
| 81 | 279–285 | 18.0 | $3.3 \times 10^5$ | 0 | 400 | 81 | ---- | 279–285 | 1.5 | 1.5 | 3 | + |
| | | | | 72 | ---- | 0 | 13.7 | 600 | 5 | 5 | 6 | + |
| 100 | 265–270 | 9.1 | $8 \times 10^3$ | 0 | 500 | 100 | ---- | 265–270 | 1 | 1 | 1 | – |
| | | | | 3 | ---- | 0 | 30.0 | >600 | 6 | 6 | 5 | + |
| | | | | 24 | ---- | 0 | 55.5 | >600 | 1 | 1 | 1 | + |
| 100 | 278–285 | 17.0 | $8 \times 10^5$ | 0 | 500 | 100 | ---- | 278–285 | 1 | 1 | 1 | – |
| | | | | 1 | ---- | 0 | 18.0 | >600 | 2.5 | 2.5 | 4 | + |
| | | | | 2 | ---- | 0 | 28.4 | >600 | 2.5 | 2.5 | 4 | + |
| 100 | 277–282 | 6.9 | $1.8 \times 10^3$ | 0 | 500 | 100 | ---- | 277–282 | 4 | 4 | 4 | – |
| | | | | 3.5 | ---- | 0 | 0 | >600 | 2.5 | 2.5 | 4 | + |
| 100 | 275–280 | 18.4 | $1.5 \times 10^6$ | 0 | 500 | 100 | ---- | 275–280 | 4 | 4 | 5 | – |
| | | | | 2 | ---- | 0 | 16.1 | >600 | 3 | 3 | 5 | + |
| | | | | 6 | ---- | 0 | 26.3 | >600 | 1 | 1 | 1 | – |
| | | | | 45 | ---- | 0 | 49.4 | >600 | | | | |

[1] Flexibility and toughness—(1) Crumbly; (2) Will bend slightly before breaking; (3) Bends but breaks; (4) Bends but cracks on creasing; (5) Bends and creases, cracks on rebending; (6) Bends, creases and recreases.
[2] Adherence—(1) None; (2) Slight; (3) Resists removal; (4) Difficult to remove; (5) Cannot remove from glass; (6) Cannot remove from steel or aluminium.
[3] Transparency—+ = Transparent; – = Opaque.
[4] In vacuum rather than inert atmosphere.

Example 2

To illustrate the laminates which can be prepared employing the linear sulfide resins of the present invention 1″ x 4″ x 0.062″ 17–7 pH stainless steel bars were prepared by degreasing in methyl ethyl ketone scrubbing with scouring powder and water, rinsing with distilled water, immersing for 2 minutes in aqua regia (3 parts HCl:1 part $HNO_3$), rinsing with distilled water and drying for 10 minutes at 110°–150° C. in a vacuum oven. These bars were immediately used after drying. A small quantity of the resin to be used for bonding was sandwiched between two bars arranged so as to provide a lap joint of ½″ x 1″ and the bars and resin pressed for 3 hours at 315° C. under a ram pressure of 40,000 pounds (ram being 4 inches in diameter). The lapped bars were then tested for lap bond shear strengths using ASTM test No. 1002–SST. The following table illustrates the bond strengths obtainable from various heat treated materials.

| Average Chain Length of Linear Polymer (mers) | Heat Treatment Conditions | | Bond Strength, p.s.i. |
|---|---|---|---|
| | Time (hrs.) | Temp. (° C.) | |
| 20 | 72 | 400 | 1,095 |
| 64 | 72 | 400 | 1,238 |
| 105 | 144 | 400 | 2,360 |
| 64 [1] | 72 | 400 | 1,280 |
| 62 [2] | | | 500 |
| 105 [2] | | | 640 |

[1] Bond formed with linear polymer then entire assembly submitted to heat treatment at 400° C. under argon atmosphere for 72 hours, then bond repressed at 300° C., 35,000 lbs. ram pressure for 30 minutes.
[2] Linear polymer used as bonding resin with no heat treatment, 1,000 pounds ram pressure and 315° C. for about 1 hour.

The above data thus establish the usefulness of the heat treated adhesives as bonding or laminating resins. It is to be further understood that when the bond parted a thin film of the resin remained attached to at least one surface. The film remaining was of various thickness depending upon the pressure applied during the laminating procedure.

While the linear resins do not have as good thermal properties as the heat treated materials, they are useful as laminating adhesives, fiber and film forming resins. Since these linear materials are thermoplastic and soluble in diphenyl oxide, the techniques of solvent spinning and solution adhesives is possible. Thus, one can prepare a solution of the linear resin in diphenyl oxide and spin the solution into methanol or acetone which will remove the diphenyl oxide or merely spin the solution into air where the diphenyl oxide is evaporated away from the resin. Likewise the solution in diphenyl oxide may be used to cast thin films of the resin, the solvent being evaporated away with mild heat ($>200°$ C.).

Example 3

In addition a laminate of the linear polymer and glass cloth was made. A laminate of a low molecular weight (ca. 6500) linear phenylene sulfide polymer was made by sandwiching six layers of polymer between seven layers of 2″ x 2″ coarse weave Volan A treated glass cloth and pressing at 1000 p.s.i. at 280° C. The finished laminate was cut into ⁵⁄₃₂″ x 2″ strips and tested. Youngs modulus by bending was $2 \times 10^6$ p.s.i. while the flexural breaking strength was $2.5 \times 10^4$ p.s.i.

The polyphenylene sulfoxide resins which can be successfully treated in accordance with the present invention and exhibit improved high temperature stability and are substantially solvent insoluble after treatment are those having the generic formula

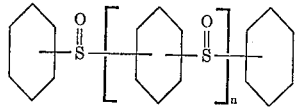

wherein $n$ represents an integer greater than 1 and is preferably sufficiently large to provide a polymer having a molecular weight of at least 2000. These materials are prepared in accordance with my copending application Ser. No. 268,444, filed even date herewith, entitled "Sulfoxide Resins." A resin prepared in accordance with Example 1 of the above application when treated in accordance with the procedure of Example 1 hereof produces a stabilized polyphenylene sulfoxide resin having substantially the same thermal stability, flexure and tensile strengths and insolubility in diphenyl oxide as does the sulfide treated material.

It is to be understood that a plurality oxidized polymeric material, that is one having less than all of the sulfur moieties oxidized, can also be stabilized in the manner of this invention.

I claim:

1. A process for preparing a stabilized polymer selected from the group consisting of (a) polyphenylene sulfides, (b) polyphenylene sulfoxides and (c) polyphenylene sulfides in which at least a portion of the sulfur moieties are oxidized to the sulfoxide, which comprises heating at a temperature of from about 400° to about 700° C. under an inert atmosphere a polymer of the class named having a molecular weight of at least about 2000 for a time, at least about 1 hour, sufficient to substantially elevate its melting point.

2. The product produced by the method of claim 1.

3. A process for preparing a stabilized polymer which comprises heating at a temperature of from about 400° to about 700° C. under an inert atmosphere a polyphenylsulfide having a molecular weight of at least 2000, for a time from 1 to 100 hours, sufficient to substantially elevate its melting point.

4. A process for preparing a stabilized polymer which comprises heating at a temperature of from about 400° C. to about 700° C. under an inert atmosphere a polyphenylene sulfoxide having a molecular weight of at least 2000, for a time from 1 to 100 hours, sufficient to substantially elevate its melting point.

5. A process for preparing a stabilized polymer which comprises heating at a temperature of from about 400° C. to about 700° C. under an inert atmosphere a polyphenylene sulfide in which at least a portion of the sulfur moieties are oxidized to the sulfoxide, for a time, at least 1 hour, sufficient to substantially elevate its melting point.

6. The process of claim 1 wherein said heating is carried out for from about 1 to 100 hours.

References Cited by the Examiner

UNITED STATES PATENTS 2,538,941   1/1951   Macallum _____ 260—79.1

JOSEPH L. SCHOFER, *Primary Examiner.*

JAMES A. SEIDLECK, D. K. DENENBERG,
*Assistant Examiners.*